Patented May 26, 1953

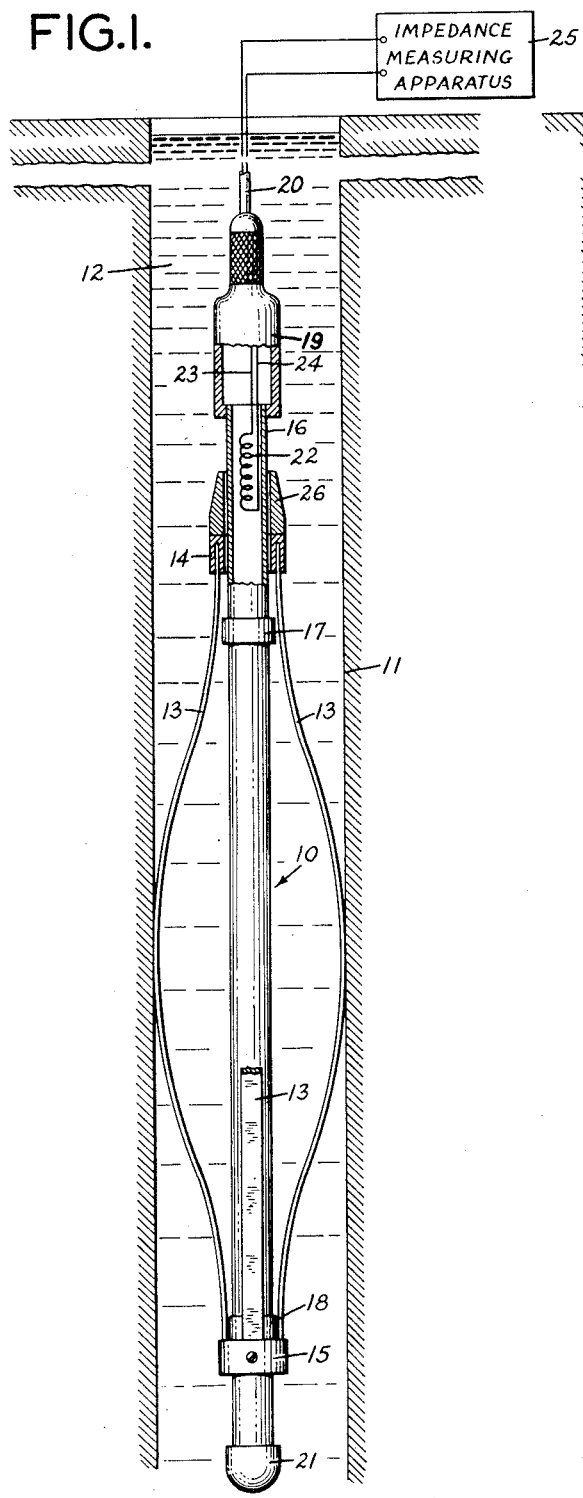

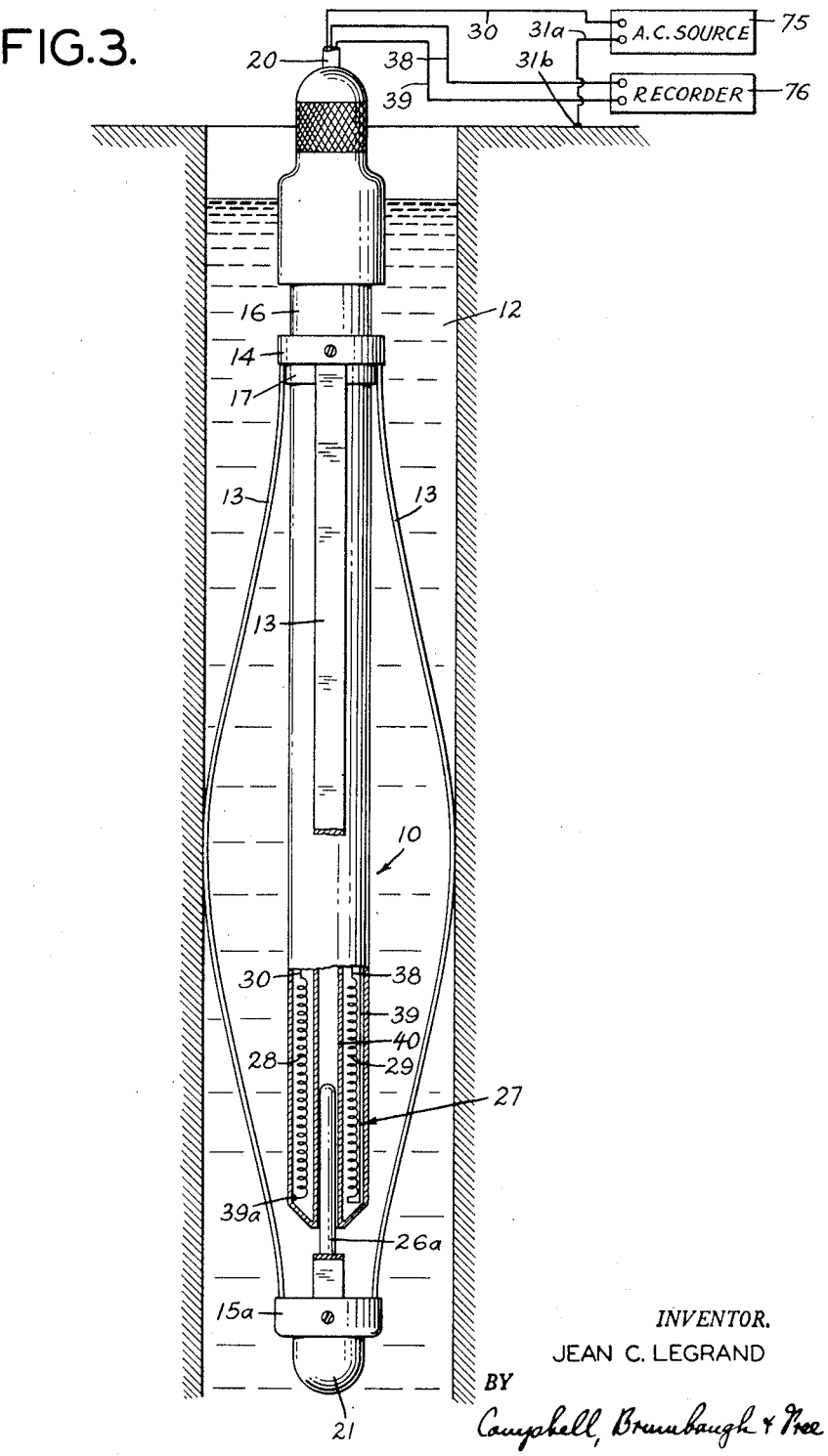

2,639,512

UNITED STATES PATENT OFFICE 2,639,512

DRILL HOLE GAUGE

Jean C. Legrand, Houston, Tex., assignor to Schlumberger Well Surveying Corporation, Houston, Tex., a corporation of Delaware Application September 26, 1947, Serial No. 776,282

2 Claims. (Cl. 33—178)

The present invention relates to apparatus for gauging the size of bore holes. More particularly it has to do with new and improved bore hole gauges for determining in a simple and highly effective manner the size of bore holes drilled into the earth, although they are not limited to such use.

Bore hole gauges employed heretofore have comprised a wall engaging member, generally having a plurality of wall engaging arms adapted to expand and contract laterally to follow changes in the bore hole diameter, and a plurality of rheostats or potentiometers having sliding contacts moved by the wall engaging arms. The rheostats or potentiometers were usually connected in electrical measuring circuits and variations in bore hole diameter were observed as variations in the resistance in such measuring circuits.

In adapting gauges of this type for use in deep weels where high pressures and temperatures obtain, packing glands and stuffing boxes were frequently used to prevent leakage of bore hole liquid into parts of the apparatus where it might damage or adversely affect the electrical system. These were found expensive and difficult to install and maintain. Further, where the casing containing the electrical system was filled with a suitable liquid to equalize the pressure of the bore hole liquid and thus reduce the packing problem, it was found that the presence of the equalizing liquid made the sliding contacts unreliable.

The principal object of the present invention, accordingly, is to provide new and improved bore hole gauging apparatus that is free from the above noted defects of prior art equipment, and is simple and highly effective in operation.

Another object of the invention is to provide new and improved bore hole gauging apparatus of the above character which has no sliding or frictional contacts in the electrical circuit, and in which the moving parts are few and capable of being exposed to the bore hole fluid and pressure without damage.

Still another object of the invention is to provide new and improved bore hole gauging apparatus of the above character in which variations in the borehole cross-section produce variations in self or mutual inductance in an indicating circuit.

In accordance with the invention, the expansion and contraction of wall engaging elements on a wall engaging member is utilized to change the self inductance in a circuit or the mutual inductance between two circuits. In the former case, indications may be obtained of variations in the impedance of a circuit including the self inductance, which variations are representative of variations in the size of the hole. In the latter case, one of the two circuits is preferably energized with alternating current and indications are obtained of the voltages induced in the second circuit by the variable mutual inductance between the two circuits, which induced voltages reflect any changes in the size of the bore hole.

Variations in self or mutual inductance are preferably produced, according to the invention, by adjusting the position of a member with respect to the self or mutual inductance. This member may be made of magnetic material such as soft iron or it may be made of an electrically conductive material such as copper, for example. Adjustment of the member is effected by the expansion and contraction of the wall engaging elements so that the variations in self or mutual inductance produced are representative of variations in the size of the bore hole. Means are also provided for insuring a linear or other desired relation between variations in bore hole size and variations in the electrical indications obtained, regardless of the relation that may exist between bore hole size variations and corresponding displacements of the wall engaging elements.

Additional objects and advantages of the invention will be apparent from the following detailed description of several representative embodiments, taken in conjunction with the accompanying drawings in which:

Figure 1 is a schematic diagram, partially in longitudinal section, illustrating apparatus constructed according to the invention for providing indications of variations in the size of a bore hole on the descent;

Figure 2 illustrates schematically another embodiment of the invention utilizing variations in mutual inductance to provide indications of variations in the size of a bore hole on the ascent; and Figure 3 is a schematic diagram of another modification in which a plunger is used to produce variations in inductance.

In Figure 1 of the drawings is shown a representative form of the invention in which the expansion and contraction of a wall engaging member is utilized to produce variations in the impedance of an electrical circuit. Referring to the figure, the bore hole gauging apparatus 10 is shown located at a given depth in a bore hole 11. The bore hole 11 may contain a column of liquid 12, although in some cases no liquid will be present. The apparatus 10 comprises a plurality of angularly spaced, arched springs 13 which are secured at their upper and lower extremities, respectively, to junctions which may be in the form of members or collars 14 and 15. Any desired number of springs 13 may be used, four being shown in Figure 1. The collars 14 and 15 are slidably mounted on a tubular member 16 on which are secured longitudinally spaced apart stop members 17 and 18 which permit restricted longitudinal movement of the collars 14 and 15 with respect to the member 16.

The tubular member 16 is secured at its upper end to a head member 19 which is connected to a supporting cable 20 in the conventional manner. The lower end of the tubular member 16 is shaped in the form of a bull-nosed plug 21 for convenience in running the assembly in the hole.

With the construction described above, it will be apparent that when the bore hole gauging apparatus 10 is being lowered through the bore hole 11, the collar 15 will be held against movement by the stop member 18 while the collar 14 will be free to move longitudinally in accordance with variations of the size of the bore hole 11. Conversely, while the bore hole gauging apparatus 10 is being raised in the bore hole 11, the collar 14 will remain fixed against the stop member 17 and the lower collar 15 will move longitudinally according to variations in the size of the bore hole 11.

By virtue of this novel construction, the apparatus may be lowered or raised in the bore hole at will with ease. Further, it will be noted that the collars 14 and 15 and attached springs 13 are rotatable with respect to the tubular member 16 so that they do not apply any torque to the supporting cable 20 as the apparatus is being moved through the bore hole 11.

Disposed within the tubular member 16 at the upper end thereof is a self inductance winding 22 which may be connected by means of conductors 23 and 24 in the supporting cable 20 to any suitable impedance measuring or recording apparatus 25, for example, located at the surface of the earth. In accordance with the invention, the self inductance of the winding 22 is varied with variations in the size of the bore hole 11. This may be accomplished in any suitable manner, as for example, by mounting a member 26 made of suitable magnetic material above the collar 14. Preferably, the magnetic member 26 should taper upwardly as shown.

For a magnetic member 26 of uniform cross-section and a uniformly wound coil 22, the inductance does not vary linearly with the motion of the member 26. However, by proper shaping of the member 26, any desired relation between variations in bore hole size and variations in inductance may be obtained. For example, the member 26 may be either elliptical or conical in longitudinal section, or slots may be cut therein to modify the section appropriately. The same result can be achieved by winding the coil 22 in a non-uniform manner, instead of changing the section of the member 26. For example, the number of turns per unit of length on the coil 22 can be varied according to any desired relation. Obviously, other means may be employed for obtaining indications of variations in the self inductance of the winding 22, as will be apparent to those skilled in the art.

It will be apparent that when the position of the springs 13 is such that the magnetic member 26 completely surrounds the winding 22, the self inductance of the latter will have a maximum value, whereas when the size of the bore hole is such that the upper end of the magnetic member 26 is approximately at the lower end of the winding 22, the self inductance of the latter will have a minimum value. By proper design, the apparatus can be constructed so that these extreme conditions obtain for the minimum and maximum diameter bore holes in which gauging operations are to be conducted. Where this is done, the impedance measuring apparatus 25 at the surface of the earth will provide indications of variations in the size of the bore hole 11 between those extreme limits. It will be understood that the impedance measuring apparatus 25 can be calibrated directly in terms of bore hole diameter if desired.

If the member 26 is made of magnetic material, then the tubular member 16 should preferably be made of a suitable nonmagnetic material such as brass, for example. If it is desired to use a member 26 made of conductive but nonmagnetic metal, then the tubular member 16 should be nonconductive; for instance, it might be made of any suitable plastic such as a phenol formaldehyde resin, for example.

Obviously, measurements can be made with equal facility as the apparatus is being raised in the bore hole instead of on the descent as in Figure 1. This may be accomplished by locating the pick-up portion of the magnetic circuit in the vicinity of the lower collar 15, as shown in greater detail in Figure 2. Here, the apparatus is mechanically the same as in Figure 1 except that the magnetic member 26 is secured below the collar 15. Also, a transformer 27 comprising the primary winding 28 and the secondary winding 29 is disposed within the tubular member 16 at the lower end thereof, instead of the self inductance winding 22.

The primary winding 28 of the transformer 27 may be energized in any suitable manner as by a source of alternating current 75, preferably of substantially constant amplitude and frequency, located at the surface of the earth, through the conductors 30 and 31 in the supporting cable 20. The voltage induced in the secondary winding 29, which is representative of the bore hole diameter at the level of the apparatus 10, may be transmitted to the surface through the cable conductors 38 and 39 to a potential indicating and recording device 76, preferably calibrated in terms of bore hole size.

When the apparatus shown in Figure 2 is raised in the bore hole, the upper collar 14 will remain fixed against the stop member 17 while the lower collar 15 will move longitudinally in accordance with variations of the size of the bore hole 11. The longitudinal displacements of the magnetic member 26 on the collar 15 will vary the mutual inductance between the primary and secondary windings 28 and 29 of the transformer 27. If the primary winding 28 is excited with alternating current of constant frequency and magnitude from the source 75 at the surface of the earth, the variations in mutual inductance will produce corresponding changes in the voltage induced in the secondary winding 29. This voltage is transmitted through the cable conductors 38 and 39 to the recorder 76 which records a curve that is representative of variations in the size of the bore hole 11. As indicated above, the recorder 76 is preferably calibrated directly in terms of bore hole diameter.

As stated, the relationship between the bore hole diameter and the movement of the free end of the springs 13 may not be linear. Hence, if the apparatus were designed to produce variations in self or mutual inductance that varied linearly with the displacement of the free end of the springs 13, the readings of the impedance measuring apparatus 25 in Figure 1 and of the recorder 76 in Figure 2 would not be linear. If a linear scale is desired, the magnetic member 26 can be so shaped as to compensate for any non-linearity that might be present. It has been found that a generally ellipsoidal or tapering cross-section for the magnetic member 26, as shown in Figures 1 and 2, will result in a linear relationship, in accordance with good engineering practice. Where this is done, the electrical response of the impedance measuring apparatus 25 or of the recorder 76 will vary substantially linearly with the bore hole diameter.

If desired, variations in inductance may be produced by a plunger instead of the member 26, as shown in Figure 3. This may be accomplished by securing the lower ends of the springs 13 to a hub-like member 15a which carries a plunger 26a made of either magnetic or conductive material, as desired. The plunger 26a extends into a bore 40 formed in the lower end of the tubular member 16, around which the coils 28 and 29 are disposed. Preferably, the coils 28 and 29 may be wound around the bore 40, one coil being placed above the other. If desired, one of the cable conductors may be eliminated by grounding one end of the winding 28 to the apparatus at 39a and connecting one terminal of the source 75 by a conductor 31a to ground 31b at the surface, as shown.

From the foregoing, it will be understood that the invention provides simple and highly effective apparatus for gauging the size or diameter of a bore hole. By converting variations in the diameter or size of a bore hole into corresponding changes in the self or mutual inductance in measuring circuits, an apparatus is provided which has few moving parts, all of which can be subjected to any fluid and pressure in the bore hole without fear of damage. Further, by mounting the wall engaging springs so as to be both rotatable and longitudinally movable within limits, the apparatus can be raised and lowered in the bore hole at will with ease and without twisting of the supporting cable.

It will be further understood that the several embodiments described above are susceptible of considerable modification within the scope of the invention. Any of the several indicating circuits described may be used indifferently in any form of the apparatus, and variations in the self or mutual inductance may be produced either by a collar or by a plunger made of magnetic material or by a combination of both. Also, any other suitable mechanical means may be used to provide a mechanical output representative of the size of a bore hole. The apparatus may be designed to operate either on the ascent or on the descent merely by proper location of the size responsive system at either the lower or upper end of the apparatus, respectively.

Instead of so constructing the collar 26 as to provide a linear relation between variations in the size of the bore hole and the readings of the electrical indicating instrument, suitably designed electrical circuits may be provided for this purpose. Further, the coils comprising the impedance or the transformer may be formed in any desired manner according to good engineering practice.

Instead of using a single inductance winding as in Figure 1, two longitudinally spaced apart windings may be employed. In this case, two independent assemblies of arched springs 13 may be employed, each being movable between its appropriate collars. Each assembly may include only two opposite arched springs; the two assemblies may be keyed or otherwise suitably secured on the tubular member 16 so that they will remain in mutually perpendicular planes. One of the windings may be influenced by one of the assemblies while the other winding may be influenced by the second assembly. The responses of the coils may be measured separately or in series, as desired. Any suitable measuring apparatus may be employed such as that shown in Figure 1, for example.

While several representative embodiments have been described above, the invention is not intended to be limited thereto but is susceptible of numerous changes in form and detail within the scope of the following claims.

I claim:

1. Apparatus for gauging a bore hole drilled into the earth comprising a support adapted to be moved through a bore hole, a wall-engaging cage formed of arched springs secured at the opposite ends to afford a pair of junctions adapted to be spaced apart longitudinally of the bore hole and mounted for movement with respect to said support longitudinally of the bore hole, stop means restricting longitudinal movement of said cage with respect to said support within predetermined limits, an indicating circuit including inductance means fixedly mounted with respect to said support, inductance modifying plunger means disposed in inductance-modifying relationship with said inductance means and movable with one of said junctions, said plunger means being responsive to the displacement of one end of said cage in accordance with variations in bore hole size for changing the influence of the inductance means on said circuit, and means for providing indications of changes produced by said inductance means in said indicating circuit.

2. Apparatus for gauging a bore hole drilled into the earth comprising a tubular support adapted to be moved through a bore hole and having a longitudinally extending bore at one end thereof, a transformer comprising a primary winding and a secondary winding mounted fixedly on said support in the vicinity of the bore therein, a source of periodically variable current connected to said primary winding, indicating means connected to said secondary winding, a wall engaging cage formed of arched springs secured at one end to a collar slidably mounted on said support and at the other end to a retaining member, inductance modifying plunger means movable with said retaining member and extending into said bore in the support for changing the inductive coupling between said transformer primary and secondary windings as a function of the size of the bore hole, and stop means restricting longitudinal movement of said cage with respect to said support within predetermined limits.

JEAN C. LEGRAND.

(References on following page)

References Cited in the file of this patent

UNITED STATES PATENTS

| Number | Name | Date |
|---|---|---|
| 1,708,354 | Cabot | Apr. 9, 1929 |
| 1,958,864 | Richardson | May 15, 1934 |
| 2,150,070 | Kregecz | Mar. 7, 1939 |
| 2,170,527 | Culbertson | Aug. 22, 1939 |
| 2,235,533 | Roberts | Mar. 18, 1941 |
| 2,267,110 | Kinley et al. | Dec. 23, 1941 |
| 2,348,643 | Poole | May 9, 1944 |
| 2,369,909 | Mestas | Feb. 20, 1945 |
| 2,427,950 | Doll | Sept. 23, 1947 |

FOREIGN PATENTS

| Number | Country | Date |
|---|---|---|
| 117,269 | Australia | July 14, 1943 |

OTHER REFERENCES

Publ.: Aircraft Engineering, April 1943, pages 106–109.